United States Patent
Roon et al.

[15] 3,655,516
[45] Apr. 11, 1972

[54] UREA ASSAY PROCESS AND COMPOSITION

[72] Inventors: Robert J. Roon; Bruce Levenberg, both of Ann Arbor, Mich.

[73] Assignee: The Regents of the University of Michigan, Ann Arbor, Mich.

[22] Filed: Oct. 10, 1969

[21] Appl. No.: 865,503

[52] U.S. Cl. .................................. 195/103.5 R, 195/99
[51] Int. Cl. .................................................. G01n 31/14
[58] Field of Search .......................... 195/103.5 R, 66 R

[56] References Cited

UNITED STATES PATENTS 3,527,674   9/1970   Deutsch ....................... 195/103.5 R

OTHER PUBLICATIONS

Dissertation Abstracts 26:6330 1966.
Grunau et al., " J. Biol. Chem." 242(15):3531– 3537 1967.

*Primary Examiner*—A. Louis Monacell
*Assistant Examiner*—Max D. Hensley
*Attorney*—Herzig & Walsh

[57] ABSTRACT

Assay of urea is provided by spectrophotometric measurement of a test solution containing the urea to be assayed together with ATP: urea amido-lyase and adenosine triphosphate as co-substrate for the enzyme, together with nicotine adenine dinucleotide, reduced; phosphoenol pyruvate; lactate dehydrogenase; pyruvate kinase; and magnesium and potassium ions. The transformation of the urea is followed quantitatively by optical absorption measurements at 340 millimicrons. The assay is unaffected by the presence of non-urea nitrogen, such as ammonia.

7 Claims, No Drawings

UREA ASSAY PROCESS AND COMPOSITION

The invention described herein was made in the course of work under a grant or award from the Department of Health, Education, and Welfare.

This invention relates to a novel procedure for urea assay, as well as a composition for the same.

The quantitative testing for urea is an important biological procedure and is widely used in connection with various body fluids, such as blood, plasma, serum, urine, etc. A number of procedures are in use, but improved methods are still needed, particularly in view of the response of most of the common methods to non-urea nitrogen, particularly ammonia.

An object of the present invention is to provide an improved assay procedure for urea, which is not affected by the presence of non-urea nitrogen in the sample under test.

Another object of the invention is to provide a composition for use in urea assay.

Other objects of the invention will appear as the description thereof proceeds.

Generally speaking, and in accordance with illustrative embodiments of our invention, we bring together in the form of an aqueous test solution effective quantities of ATP: urea amido-lyase; adenosine-5-triphosphate; magnesium ions; potassium ions, nicotinamide adenine dinucleotide, reduced; phosphoenol pyruvate; lactate dehydrogenase; and pyruvate kinase. To this test solution we then add a known amount of material such as a solution containing the urea to be assayed. By reason of the presence of the several components, the nicotine adenine dinucleotide originally present disappears from the test solution as a result of transformation to another compound, in strict proportionality to the amount of urea originally added. The quantity of nicotine adenine dinucleotide which disappears may be determined by any convenient method, although we prefer and find best the determination of the change in optical absorption of the solution at a wavelength of about 340 millimicrons.

The ingredients of the test solution listed hereinabove are all readily available and obtainable commercially from biochemical supply houses, with the exception of the ATP: urea amido-lyase. This is a novel enzyme which may be produced by culturing the yeast, *Candida utilis*, under conditions in which the sole nitrogen source is urea.

It may also be produced by similarly culturing the green algae, *Chlorella ellipsoidea* and *Chlorella pyrenoidosa*. 243, Further details on this enzyme may be found in our paper in the Journal of Biological Chemistry, Volume 243, pages 5213–5215 (1968), which, while not essential to an understanding of the instant invention, is hereby incorporated herein by reference, together with the articles listed in the bibliography thereto on page 5215.

As set forth in our Journal of Biological Chemistry article cited in the preceding paragraph, we may produce the ATP; urea amido-lyase by growing the selected organism, for example, *Candida utilis*, aerobically on a glucose-salts-biotin medium supplemented with sterile filtered urea as the sole nitrogen source. Typically, the aerated liquid medium may have the following composition: 20g glucose; 0.43g urea; 0.5g $KH_2PO_4$; 0.5g $MgSO_4 \cdot 7H_2O$; 0.3g $CaCl_2 \cdot 2H_2O$; 0.1μg biotin; 70 μg zinc; 10μg B, Mn, Cu, Mo, and Fe; pH of medium adjusted to 5.3. After culturing, the cells are disrupted ultrasonically, and the resulting product is centrifuged at 105,000 X g. This supernantant contains the desired enzyme. It may be purified approximately thirtyfold by conventional ammonium sulfate fractionation and column chromatography. Conventional column packings such as diethylaminoethyl cellulose and cross-linked dextran, such as that sold under the trade name Sephadex G-200, may be used.

The mechanism involved in our inventive assay to the extent that we have been able to elucidate it, appears to be bound up with the unique mode of action of the enzyme, in which it catalyzes the magnesium- and potassium-dependent decomposition of 1 mole of urea to 1 mole of carbon dioxide and 2 moles of ammonia, concomitant with the cleavage of 1 mole of adenosine-5-triphosphate to adenosine diphosphate. This permits in turn the utilization of the pyruvate kinase-lactate dehydrogenase method of measuring adenosine diphosphate. Those interested in reviewing the reactions involved will find descriptions in the papers by J. A. Grunau et al., the Journal of Biological Chemistry, Volume 242, pages 3531–3537 (1967), and by N. G. Pon et al, Analytical Biochemistry, Volume 19, pages 272–279 (1967). These two papers are hereby included herein by reference.

It is advantageous to include a buffer in the test solution. We prefer tris(hydroxymethyl)aminomethane or triethanolamine, at an optimum pH of 8, although a range of about 6 to 10 is workable. The aqueous test solution may advantageously contain about 4 millimoles per liter of adenosine-5-triphosphate; 0.15 m moles per liter of nicotine adenine dinucleotide, reduced; about 1.5 m moles per liter of phosphoenol pyruvate; about 5 International Units (IU) per test of pyruvate kinase; the same quantity of lactate dehydrogenase; 0.05 moles per liter of potassium ion, and about 0.008 moles per liter of magnesium ion. The latter two components may be added as any simple salt such as chloride, sulfate, or acetate. However, all of the concentrations just given may be varied up or down by a factor of at least 5. The concentrations given have been found to be operative, and moreover, bring about the enzymatic conversion of the urea in a reasonably short time.

A working example will now be given, illustrating the operation of our invention.

A test solution is prepared as follows, having a total volume of about 3 ml:

TEST SOLUTION

| | |
|---|---|
| Tris(hydroxymethyl)aminomethane, 0.1 molar, pH 8: | 2.5 ml. |
| Magnesium sulfate, 0.5 molar: | 0.06 ml. |
| Potassium chloride, 2 molar: | 0.12 ml. |
| Adenosine-5-triphosphate, $Na_2$: | 6.6 mg. |
| Nicotine adenine dinucleotide, reduced, 0.01 molar: | 0.05 ml. |
| Phosphoenol pyruvate, 0.06 molar | 0.1 ml. |
| Lactate dehydrogenase: | 5 I.U. |
| Pyruvate kinase: | 5 I.U. |
| ATP: urea amido-lyase, ex Candida utilis: | 0.2 mg. |

The above test solution is incubated for 5 minutes at 30° C. in a water bath. It is then placed into a spectrophotometer and the absorbence measured at 340 millimicrons. A second reading is taken 5 minutes later to insure stability of the test solution. Then to this solution there is added 0.1 ml of a liquid containing the urea to be assayed, which may be for example blood plasma. Mixing is quickly obtained by tapping the cuvette, and the absorbence is again measured. Additional readings are taken every 5 minutes until the change is less than 0.01 (logarithmic optical density scale) per minute. In general, the reaction will be complete at the end of 20 minutes from adding the urea sample. The optical density readings obtained are converted to absolute quantities of urea by reference to a calibration chart prepared from the results of test on known amounts of urea.

Our invention further contemplates the preparation of a dry mixture of the test ingredients, conveniently omitting the buffer. Thus, we may prepare a test mixture containing the following ingredients in an intimate mixture in the relative proportions shown, the total quantity being sufficient for 1000 assays:

REAGENT MIXTURE

| | |
|---|---|
| Magnesium sulfate: | 0.03 mols |
| Potassium chloride: | 0.24 mols |
| Adenosine-5-triphosphate, $Na_2$: | 6.6 grams |
| Nicotine adenine dinucleotide, reduced: | 0.5 millimols |
| Phosphoenol pyruvate: | 6 millimols |

| | |
|---|---|
| Lactate dehydrogenase: | 5000 I.U. |
| Pyruvate kinase: | 5000 I.U. |
| ATP: urea amido-lyase: | 0.2 grams |

We use the term "mols" in its usual sense, to indicate gram mols.

We wish it to be understood that we do not desire to be limited to the exact details of procedure shown and described, for obvious modifications will occur to a person skilled in the art.

Having described the invention, we claim:

1. The method of determining the quantity of urea in a solution thereof which comprises adding a known amount of said urea solution to an aqueous test solution containing effective quantities of ATP: urea amido-lyase; adenosine-5-triphosphate; magnesium ions; potassium ions; nicotine adenine dinucleotide, reduced; phosphoenol pyruvate, lactate dehydrogenase; and pyruvate kinase;

and determining the quantity of nicotine adenine dinucleotide which disappears from said test solution as a measure of said quantity of urea.

2. The method in accordance with claim 1 wherein said disappearance of said nicotine adenine dinucleotide is determined by optical absorption at a wavelength of about 340 millimicrons.

3. The method in accordance with claim 1 wherein said ATP: urea amido-lyase is derived from *Candid utilis*.

4. The method in accordance with claim 1 wherein said test solution is buffered to a pH of about 8.

5. The method in accordance with claim 4 wherein said test solution contains, per unit volume of about 3 ml, the following:

| | |
|---|---|
| tris(hydroxymethyl)aminomethane, 0.1 molar, pH 8: | 2.5 ml. |
| magnesium sulfate, 0.5 molar: | 0.06 ml. |
| potassium chloride, 2 molar: | 0.12 ml. |
| adenosine-5-triphosphate, $Na_4$: | 6.6 mg. |
| nicotine adenine dinucleotide, reduced, 0.01 molar: | 0.05 ml. |
| phosphoenol pyruvate, 0.06 molar: | 0.1 ml. |
| lactate dehydrogenase: | 5 I.U. |
| pyruvate kinase: | 5 I.U. |
| ATP: urea amido-lyase: | 0.2 mg. |

6. A composition of matter adapted for urea assay consisting essentially of a mixture of ATP: urea amido-lyase; adenosine-5-triphosphate; nicotine adenine dinucleotide, reduced; phosphoenol pyruvate; lactate dehydrogenase; pyruvate kinase; divalent magnesium, and monovalent potassium.

7. A composition in accordance with claim 6 in which the components are present in the following relative proportions:

| | |
|---|---|
| ATP: urea amido-lyase: | 0.2 grams |
| adenosine-5-triphosphate, as disodium salt: | 6.6 grams |
| nicotine adenine dinucleotide, reduced: | 0.5 millimols |
| phosphoenol pyruvate: | 6 millimols |
| lactate dehydrogenase: | 5000 I.U. |
| pyruvate kinase: | 5000 I.U. |
| magnesium cation: | 0.03 mols |
| potassium cation: | 0.24 mols |

* * * * *